US008775140B2

(12) United States Patent
Yu

(10) Patent No.: US 8,775,140 B2
(45) Date of Patent: Jul. 8, 2014

(54) TIME AND SPACE SCALED S-MODEL FOR TURBULENT FLUID FLOW SIMULATIONS

(75) Inventor: Jiun-Der Yu, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 270 days.

(21) Appl. No.: 13/398,183

(22) Filed: Feb. 16, 2012

(65) Prior Publication Data
US 2013/0218536 A1 Aug. 22, 2013

(51) Int. Cl.
*G06G 7/50* (2006.01)
(52) U.S. Cl.
USPC ....................................... 703/9; 703/2; 703/5
(58) Field of Classification Search
USPC ....................................... 703/1, 2, 9
See application file for complete search history.

(56) References Cited

U.S. PATENT DOCUMENTS

| 7,555,413 B2* | 6/2009 | Inagaki | 703/2 |
| 2007/0244680 A1* | 10/2007 | Su | 703/9 |
| 2008/0015830 A1* | 1/2008 | Chen et al. | 703/9 |

OTHER PUBLICATIONS

Wikipedia, "Large eddy simulation," revision as of Jan. 22, 2011.*
G. Mayer, G. Hazi, "Direct numberical and large eddy simulation of longitudinal flow along triangular array of rods using the lattice Boltzmann method," Mathematics and Computers in Simulation 72 {2006} p. 173-178.*
M. Lesieur, O. Metais, "New Trends in Large-Eddy Simulations of Turbulence," Annu. Rev. Fluid Mech., 1996. 28:45-82.*
L. L Zhou, Y. Liu, "Two-Phase Subgrid-Scale (SGS) Stress Models for Two-Fluid Large-Eddy Simulation of Gas-Particle Flows," 7th International Conference on Multiphase Flow, ICMF 2010, Tampa, FL, USA, May 30-Jun. 4, 2010.*
J.A. Domaradzki, et al., "A subgrid-scale estimation model applied to large eddy simulations of compressible turbulence," Center for Turbulence Research, Proceedings of the Summer Program 1998.*
Smagorinsky, J., "General Circulation Experiments with the Primitive Equations, Part I: The basic experiment", Monthly Weather Review, vol. 91, No. 3, Mar. 1963.
Germano, M., et al., "A Dynamic Subgrid-Scale Eddy Viscosity Model", Phys. of Fluids A, 3, No. 7, pp. 1760-1765, 1991 American Institute of Physics.
Domaradzki, J.A., et al., "A subgrid-scale model based on the estimation of unresolved scales of turbulence", Phys. of Fluids, vol. 9, No. 7, pp. 2148-2164, Jul. 1997, American Institute of Physics.
Geurts, B. J., "Inverse Modeling for Large-Eddy Simulation", Phys. of Fluids, vol. 9, No. 12, pp. 3585-3587, Dec. 1997, American Institute of Physics.
Stolz, S., et al., "An approximate deconvolution procedure for large-eddy simulation", Physics of Fluids, vol. 11, No. 7, pp. 1699-1701, Jul. 1999.
Stolz, S., et al., "An approximate deconvolution model for large-eddy simulation with application to incompressible wall-bounded flows", Physics of Fluids, vol. 13, No. 4, pp. 997-1015, Apr. 2001.

(Continued)

*Primary Examiner* — Omar Fernandez Rivas
*Assistant Examiner* — Joseph J Rokita

(57) ABSTRACT

The present invention comprises systems and methods for large eddy simulations using a scaled S-model, which may be scaled in both time and space. Prior large eddy simulation models require at least one special coefficient, which vary from case to case and need to be decided experimentally or empirically. In embodiments, the scaled S-model does not require any coefficient that varies case by case or needs to be decided experimentally or empirically.

16 Claims, 7 Drawing Sheets

(56) References Cited

OTHER PUBLICATIONS

Stolz, S., et al., "The approximate deconvolution model for large-eddy simulations of compressible flows and its application to shock-turbulent-boundary-layer interaction", Physics of Fluids, vol. 13, No. 10, pp. 2985-3001, Oct. 2001.

Shah, K. B., et al., "A new non-eddy viscosity subgrid-scale model and its application to channel flow", Center for Turbulence Research, Annual Research Briefs, Stanford University, pp. 73-90, 1995.

Su, M., et al., "Large Eddy Simulation of the Turbulent Flow around a Circular Cylinder with Non-eddy Viscosity SGS model", Second AFOSR Int. Conf. on DNS and LES, Rutgers University, USA, Jun. 7-9, 1999.

* cited by examiner

- ● = currently considered cell $i$
- ∗ = location of variable in a direct neighbor cell
- ○ = location of variable in neighbors' neighbor cells
- □ = examples of locations that are not in a neighborhood of cell $i$

600

US 8,775,140 B2

TIME AND SPACE SCALED S-MODEL FOR TURBULENT FLUID FLOW SIMULATIONS

BACKGROUND

1. Field of Invention

The present application is directed towards systems and methods for simulating fluid flow.

2. Description of the Related Art

Computational Fluid Dynamics (CFD) have been widely applied to help understand physics, improve engineering designs, analyze the environment (e.g., atmosphere, ocean, and the like), and predict weather. To achieve good results from simulations, the simulations should be sufficiently detailed; however, as the desired simulation detail increase, both the model complexities and the computational costs also increase. Because of ever increasing requirements on the complexity of geometry, larger number of meshes, and ever increasing desire for accuracy, practical CFD simulations require high performance algorithms, high speed processors, and sophisticated models.

In addition to the difficulties involved in simulating complex geometries, difficulties also arise when trying to model very complex fluid flows. Modeling certain fluid flows, particularly turbulent flows, can be extremely difficult, if not impossible. Direct numerical simulation (DNS) of turbulence flow can be performed by solving the Navier-Stokes (NS) equations without using any turbulence model. However, due to the enormous computation resource requirement, it is not currently feasible for complex geometries and high Reynolds numbers.

Accordingly, what is needed are systems and methods for simulating fluid flows for complex situations, such as complex turbulent fluid flows.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the scope of the invention to these particular embodiments.

DESCRIPTION OF THE PREFERRED EMBODIMENTS

Figure 1:
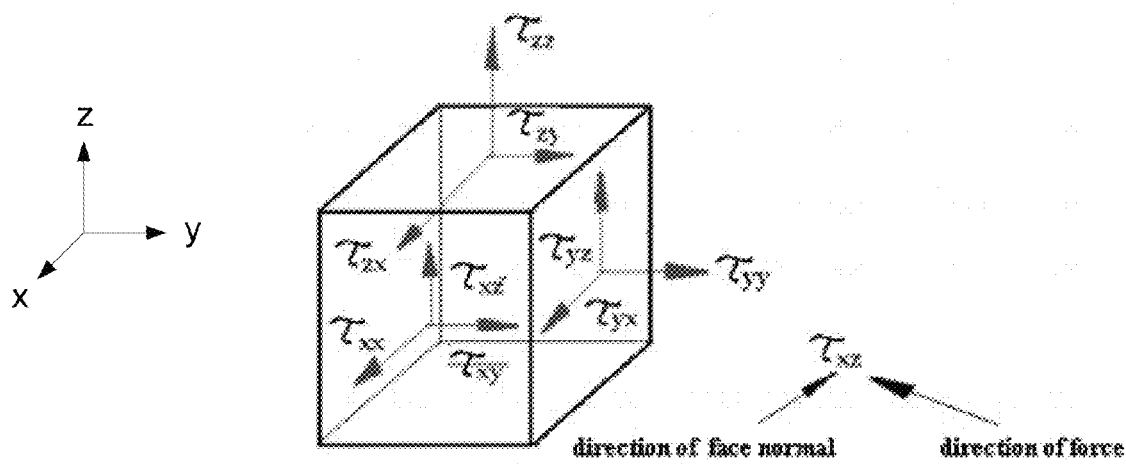
FIG. 1 illustrates the coordinate and stress system of the symbols of stress τ according to embodiments of the present invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, including software, hardware, or firmware, or combinations thereof. Accordingly, the figures and written description herein are illustrative of specific embodiments of the invention, which are meant to elucidate the inventive aspects and shall not be used to limit the invention to those specific embodiments.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. Usage of the term "service" or "function" is not limited to describing a single function; usage of the term also may refer to a grouping of related functions or functionality. Similarly, usage of the term "resource" is not limited to describing a single resource; the term also may be used to refer to a set of resources that may either be distributed or aggregated within a computing environment.

The present invention comprises systems and methods for large eddy simulations using a scaled S-model, which may be scaled in both time and space. Prior large eddy simulation models required at least one special coefficient, which varied from case to case and needed to be decided experimentally or empirically. In embodiments, the scaled S-model does not require any coefficient that varies case by case or needs to be decided experimentally or empirically. It shall be noted that although embodiments of the present invention relates to systems and methods for large eddy simulation, aspects of the present invention may be used to simulate complex fluid flow in a variety of configurations without going beyond the spirit and scope of the present invention.

I. Introduction

As mentioned above, direct numerical simulation (DNS) of turbulence flow can be performed by solving the Navier- Stokes (NS) equations without using any turbulence model, but due to the enormous computation resource requirement, it is not currently feasible for complex geometries and high Reynolds numbers.

On the other hand, the Large Eddy Simulation (LES), although requiring the use of sub-grid scale (SGS) models, can accurately capture unsteady turbulent motions at high Reynolds numbers and requires significantly lower computation resources than DNS. Therefore LES has been an important tool to simulate and to investigate turbulence flows.

In LES, each physical quantity is divided into two parts: a filtered quantity, and a difference between the original and the filtered quantities. The filtered quantity is a resolved scale quantity because it is solved directly from the LES equations. The difference between the original and the filtered quantities is an unresolved small scale value. Because of the existence of the nonlinear terms, the filtering of the NS equations introduces correlation quantities of these unknown small scale quantities, which may also be called quasi-Reynolds stresses and may be modeled with SGS models. The development of physically correct, numerically stable, and computationally efficient SGS model is an important subject of LES. The most common models for these small scale values are Smagorinsky and dynamic models, as discussed in, for example, Smagorinsky, J., "General Circulation Experiments with the Primitive Equations, Part I: The basic experiment," Mon. Wea. Rev., 91, 99 (1963), and Germano, M., Piomelli, U., Moin, P., and Cabot, W., "A dynamic subgrid-scale eddy viscosity model," Phys. of Fluids, A, 3, No. 7, 1760-1765. In these models, the eddy-viscous coefficient, obtained empirically or using certain physical hypothesis, is necessary. Recently, some researchers have tried to get the correlation of small scale values directly without using the eddy-viscous coefficient, for example, J. A. Domaradzki, J. A., and Saiki, E. M., "A subgrid-scale model based on the estimation of unresolved scales of turbulence," Phys. Fluids 9, 2148 (1997), and Geurts, B., "Inverse modeling for large-eddy simulations," Phys. Fluids 9, 3585 (1997). Since the correlation of small scale values shows up due to the filtering of the nonlinear terms in the NS equations, to obtain the inverse filter is a possible choice. Adams and his coworkers developed an approximate algorithm (ADM) for inverse filtering as discussed, for example, in Stolz, S., and Adams, A., "An approximate deconvolution procedure for large-eddy simulation," Physics of Fluids, 7, 1699 (1999); Stolz, S., Adams, A., and Kleiser, L., "An approximate deconvolution model for large-eddy simulation with application to incompressible wall-bounded flows," Physics of Fluids, 4, 997 (2001); and Stolz, S., Adams, A., and Kleiser, L., "The approximate deconvolution model for large-eddy simulations of compressible flows and its application to shock-turbulent-boundary-layer interaction," Physics of Fluids, 10, 2985 (2001). Though successful, ADM is a difficult algorithm and can only be used with Cartesian coordinates and rectangular meshes. Hence its application is limited to fluid flows with simple geometries.

In 1995, Ferziger and his colleague developed a new "Stimulated Small Scale SGS model" and successfully simulated the turbulence flow between two infinite parallel plates, as discussed in Shah, K. B. and Ferziger, J. H., "Stimulated small scale SGS model and its application to channel flow," Annual Research Briefs. Center of Turbulence Research, Stanford University (1995). Although their work is about the simplest turbulent flow, which is usually used as a benchmark to test new SGS models, their algorithm is simple and the idea is inspiring. In 1999, Su and Kang extended this model to simulate the turbulent flow around a circular cylinder with critical Reynolds number Re=3900, as discuss in Su, M. D., and Kang, Q. J., "Large Eddy Simulation of Turbulent Flows around a Circular Cylinder with non-eddy Viscosity Subgrid Scale (SSS) model," Second AFOSR Int. Conf. on DNS & LES, Ruther University, USA, Jun. 7-9, 1999. Comparison with the corresponding DNS results shows the extended model was successful. All of the foregoing references are incorporated by reference herein in their entireties.

The present patent document presents systems and methods to simulate turbulent flows with unstructured meshes. It shall be noted that the systems and methods may also be applied to structured meshes, which are special cases of unstructured meshes. In embodiments, the model is a time and space scaled S-model. This document comprises seven sections. In section II, the basic equations of LES are presented. Embodiments of the scaled S-model on grids are presented in section III. Section IV presents systems and methods for simulating fluid flow using a scaled S-Model. Section V presents, by way of example, a BGK scheme for solving the LES equations. Section VI presents embodiments for parallel processing with unstructured meshes. And, Section VII presents devices, systems, and the like that may be used to implement and/or embody aspects of the present invention.

II. Basic Equations of LES

Compressible flow of lower Mach number is considered herein. The governing equations, i.e. the Navier-Stokes equations, are as follows. Equation (2.1) presents the Continuity equation:

$$\frac{\partial \rho}{\partial t} + \frac{\partial (\rho u)}{\partial x} + \frac{\partial (\rho v)}{\partial y} + \frac{\partial (\rho w)}{\partial z} = 0 \tag{2.1}$$

Equations (2.2)-(2.4) presents that Momentum equations:

$$\frac{\partial (\rho u)}{\partial t} + \frac{\partial (\rho u u)}{\partial x} + \frac{\partial (\rho u v)}{\partial y} + \frac{\partial (\rho u w)}{\partial z} = -\frac{\partial p}{\partial x} + \frac{\partial \tau_{xx}}{\partial x} + \frac{\partial \tau_{yx}}{\partial y} + \frac{\partial \tau_{zx}}{\partial z} \tag{2.2}$$

$$\frac{\partial (\rho v)}{\partial t} + \frac{\partial (\rho v u)}{\partial x} + \frac{\partial (\rho v v)}{\partial y} + \frac{\partial (\rho v w)}{\partial z} = -\frac{\partial p}{\partial y} + \frac{\partial \tau_{xy}}{\partial x} + \frac{\partial \tau_{yy}}{\partial y} + \frac{\partial \tau_{zy}}{\partial z} \tag{2.3}$$

$$\frac{\partial (\rho w)}{\partial t} + \frac{\partial (\rho w u)}{\partial x} + \frac{\partial (\rho w v)}{\partial y} + \frac{\partial (\rho w w)}{\partial z} = \tag{2.4}$$

$$-\frac{\partial p}{\partial z} + \frac{\partial \tau_{xz}}{\partial x} + \frac{\partial \tau_{yz}}{\partial y} + \frac{\partial \tau_{zz}}{\partial z}$$

Equation (2.5) is the Energy equation:

$$\frac{\partial (\rho E)}{\partial t} + \frac{\partial (\rho E u)}{\partial x} + \frac{\partial (\rho E v)}{\partial y} + \frac{\partial (\rho E w)}{\partial z} = \tag{2.5}$$

$$-\frac{\partial (pu)}{\partial x} - \frac{\partial (pv)}{\partial y} - \frac{\partial (pw)}{\partial z} + \frac{k}{C_V}\left(\frac{\partial^2 e}{\partial x^2} + \frac{\partial^2 e}{\partial y^2} + \frac{\partial^2 e}{\partial z^2}\right) +$$

$$\frac{\partial (\tau_{xx} u)}{\partial x} + \frac{\partial (\tau_{xy} v)}{\partial x} + \frac{\partial (\tau_{xz} w)}{\partial x} + \frac{\partial (\tau_{yx} u)}{\partial y} +$$

$$\frac{\partial (\tau_{yy} v)}{\partial y} + \frac{\partial (\tau_{yz} w)}{\partial y} + \frac{\partial (\tau_{zx} u)}{\partial z} + \frac{\partial (\tau_{zy} v)}{\partial z} + \frac{\partial (\tau_{zz} w)}{\partial z}$$

where $e = C_v T$ $$E = e + \frac{1}{2}(u^2 + v^2 + w^2).$$

Above, u, v, w, are the velocity components, ρ represents density, p represents pressure, T represents temperature, e represents internal energy, $C_v$ represents the specific heat, and k represents the thermal conductivity coefficient. In addition, the symbols of viscous stress τ are shown as in FIG. 1, and which are readily known by those of ordinary skill in the art.

After the filtering of Equations (2.1)-(2.5), we have $$\frac{\partial \bar{\rho}}{\partial t} + \frac{\partial \overline{\rho u}}{\partial x} + \frac{\partial \overline{\rho v}}{\partial x} + \frac{\partial \overline{\rho w}}{\partial x} = 0 \quad (2.6)$$

$$\frac{\partial \overline{\rho u}}{\partial t} + \frac{\partial \overline{\rho u u}}{\partial x} + \frac{\partial \overline{\rho u v}}{\partial y} + \frac{\partial \overline{\rho u w}}{\partial z} = \quad (2.7)$$
$$-\frac{\partial \bar{p}}{\partial x} + \frac{\partial \bar{\tau}_{xx}}{\partial x} + \frac{\partial \bar{\tau}_{yx}}{\partial y} + \frac{\partial \bar{\tau}_{zx}}{\partial z} - \frac{\partial \overline{(\rho u)'u'}}{\partial x} - \frac{\partial \overline{(\rho u)'v'}}{\partial y} - \frac{\partial \overline{(\rho u)'w'}}{\partial z}$$

$$\frac{\partial \overline{\rho v}}{\partial t} + \frac{\partial \overline{\rho v u}}{\partial x} + \frac{\partial \overline{\rho v v}}{\partial y} + \frac{\partial \overline{\rho v w}}{\partial z} = \quad (2.8)$$
$$-\frac{\partial \bar{p}}{\partial y} + \frac{\partial \bar{\tau}_{xy}}{\partial x} + \frac{\partial \bar{\tau}_{yy}}{\partial y} + \frac{\partial \bar{\tau}_{zy}}{\partial z} - \frac{\partial \overline{(\rho v)'u'}}{\partial x} - \frac{\partial \overline{(\rho v)'v'}}{\partial y} - \frac{\partial \overline{(\rho v)'w'}}{\partial z}$$

$$\frac{\partial \overline{\rho w}}{\partial t} + \frac{\partial \overline{\rho w u}}{\partial x} + \frac{\partial \overline{\rho u v}}{\partial y} + \frac{\partial \overline{\rho w w}}{\partial z} = \quad (2.9)$$
$$-\frac{\partial \bar{p}}{\partial z} + \frac{\partial \bar{\tau}_{xz}}{\partial x} + \frac{\partial \bar{\tau}_{yz}}{\partial y} + \frac{\partial \bar{\tau}_{zz}}{\partial z} - \frac{\partial \overline{(\rho w)'u'}}{\partial x} - \frac{\partial \overline{(\rho w)'v'}}{\partial y} - \frac{\partial \overline{(\rho w)'w'}}{\partial z}$$

$$\frac{\partial \overline{\rho E}}{\partial t} + \frac{\partial \overline{\rho E u}}{\partial x} + \frac{\partial \overline{\rho E v}}{\partial y} + \frac{\partial \overline{\rho E w}}{\partial z} = \quad (2.10)$$
$$-\frac{\partial \overline{\rho u}}{\partial x} - \frac{\partial \overline{\rho v}}{\partial y} - \frac{\partial \overline{\rho w}}{\partial z} + \frac{k}{C_V}\left(\frac{\partial^2 \bar{e}}{\partial x^2} + \frac{\partial^2 \bar{e}}{\partial y^2} + \frac{\partial^2 \bar{e}}{\partial z^2}\right) + \frac{\partial \bar{\tau}_{zx} \bar{u}}{\partial x} +$$
$$\frac{\partial \bar{\tau}_{xy} \bar{v}}{\partial x} + \frac{\partial \bar{\tau}_{xz} \bar{w}}{\partial x} + \frac{\partial \bar{\tau}_{yx} \bar{u}}{\partial y} + \frac{\partial \bar{\tau}_{yy} \bar{v}}{\partial y} + \frac{\partial \bar{\tau}_{yz} \bar{w}}{\partial y} + \frac{\partial \bar{\tau}_{zx} \bar{u}}{\partial z} +$$
$$\frac{\partial \bar{\tau}_{zy} \bar{v}}{\partial z} + \frac{\partial \bar{\tau}_{zz} \bar{w}}{\partial z} - \frac{\partial \overline{(\rho E)'u'}}{\partial x} - \frac{\partial \overline{(\rho E)'v'}}{\partial y} - \frac{\partial \overline{(\rho E)'w'}}{\partial z} -$$
$$\frac{\partial \overline{\rho' u'}}{\partial x} - \frac{\partial \overline{\rho' v'}}{\partial y} - \frac{\partial \overline{\rho' w'}}{\partial z} + \frac{\partial \overline{\tau'_{xx} u'}}{\partial x} + \frac{\partial \overline{\tau'_{xy} v'}}{\partial x} + \frac{\partial \overline{\tau'_{xz} w'}}{\partial x} +$$
$$\frac{\partial \overline{\tau'_{yx} u'}}{\partial y} + \frac{\partial \overline{\tau'_{yy} v'}}{\partial y} + \frac{\partial \overline{\tau'_{yz} w'}}{\partial y} + \frac{\partial \overline{\tau'_{zx} u'}}{\partial z} + \frac{\partial \overline{\tau'_{zy} v'}}{\partial z} + \frac{\partial \overline{\tau'_{zz} w'}}{\partial z}$$

Concerning notation, the "bar" field variable (e.g., $\overline{\rho E}$, $\bar{u}$, $\bar{e}$, etc.) represent the filtered values for the variables, and the "prime" field variables (e.g, (ρv)', u', etc.) represents the small scale values for the variables. Equations (2.6)-(2.10) are the basic equations of LES. Comparing the Navier-Stokes equations (2.1)-(2.5) and LES equations (2.6)-(2.10), it can be seen that the LES equations can be divided into two parts: terms that are only related to the filtered values and terms including the correlation of small scale values. The first part of the LES equations is the same as the NS equations if the filtered values are replaced by the corresponding unfiltered values. Therefore, the LES equations can be solved in two steps:

(1) Calculate correlations of the small scale values by the scaled S-model. These correlation terms may then be used to correct the field values solved from the LES equations.

(2) Solve the LES equations with those correlation terms to obtain updated filtered values. It shall be noted that any method or numerical scheme for solving compressible Navier-Stokes equations can be used to solve the LES equations. One example of such a numerical scheme, which may be used in embodiments, is the BGK scheme, which is discussed in more detail below. In embodiments, steps (1) and (2) are repeated for as long as desired.

III. Embodiments of Time and Space Scaled S-Model on Unstructured Grids

In embodiments, instead of using an eddy viscous model, the correlations of small scale values in Equations (2.7)-(2.10) may be obtained with a scaled model, such as a time and space scaled S-model which is described herein. In embodiments, the time and space scaled S-model is based on the "inverse filtering" of the filtered quantities solved from the LES equations. This is to say, using the S-model, one inverse filters the filtered quantity to obtain the original quantity, and taking the difference of the original and the filtered quantities to get the corresponding small scale quantity.

Figure 2:
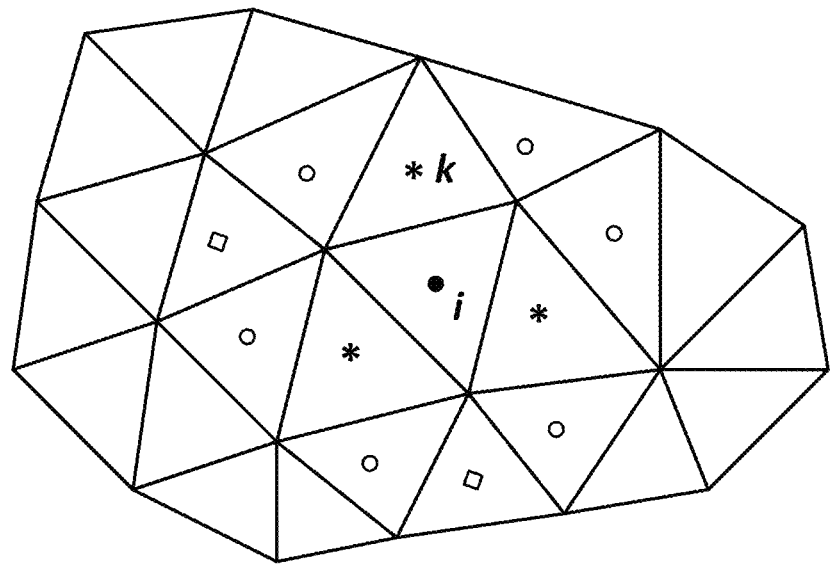
FIG. 2 illustrates a patch of grid cells in an unstructured grid system or mesh according to embodiments of the invention.

For complex fluid flow problems, especially those encountered in industry, an unstructured mesh system must be used. FIG. 2 depicts an example of an unstructured mesh according to embodiments of the present invention. For simplicity, a two-dimensional unstructured grid is shown although the present invention may be used for three-dimensional meshes. The field variable f, which may be, for example, ρ, u, v, w, e, or some combination thereof, is located at the center of each grid cell. After filtering, such as for example box filtering, the filtered value is denoted by $\bar{f}$. In addition, the value of the field variable f at the center of mesh i is denoted as $f_i$ while its value at the center of mesh k is denoted as $f_k$.

The time and space scale S-model is presented below in embodiments based on cell-centered field variable location. However, it shall be noted that the model concept may be applied to simulation cases in which field variables are located at other locations, such as on grid points.

In embodiments, the first part of the model is to relate the original field value to the filtered field value. For any flow field in three space dimensions, its Taylor series expansion around the center of a grid cell i has the form as shown in Equation (3.1), below:

$$f_i(x, y, z) = f_i + \left(\frac{\partial f}{\partial x}\right)_i (x - x_i) + \left(\frac{\partial f}{\partial y}\right)_i (y - y_i) + \quad (3.1)$$
$$\left(\frac{\partial f}{\partial z}\right)_i (z - z_i) + \frac{1}{2}\left(\frac{\partial^2 f}{\partial x^2}\right)_i (x - x_i)^2 +$$
$$\frac{1}{2}\left(\frac{\partial^2 f}{\partial y^2}\right)_i (y - y_i)^2 + \frac{1}{2}\left(\frac{\partial^2 f}{\partial z^2}\right)_i (z - z_i)^2 +$$
$$\left(\frac{\partial^2 f}{\partial x \partial y}\right)_i (x - x_i)(y - y_i) +$$
$$\left(\frac{\partial^2 f}{\partial y \partial z}\right)_i (y - y_i)(z - z_i) + \left(\frac{\partial^2 f}{\partial x \partial z}\right)_i (x - x_i)(z - z_i)$$
$$= f_i + X_i \cdot D_i$$

where $x_i$, $y_i$, $z_i$ are the coordinates of the center of cell i, $f_i$ is the original value of the flow field variable at the center of cell i, and $$D_i = \left\{ \left(\frac{\partial f}{\partial x}\right)_i, \left(\frac{\partial f}{\partial y}\right)_i, \left(\frac{\partial f}{\partial z}\right)_i, \left(\frac{\partial^2 f}{\partial x^2}\right)_i, \right. \qquad (3.2)$$
$$\left. \left(\frac{\partial^2 f}{\partial y^2}\right)_i, \left(\frac{\partial^2 f}{\partial z^2}\right)_i, \left(\frac{\partial^2 f}{\partial x \partial y}\right)_i, \left(\frac{\partial^2 f}{\partial y \partial z}\right)_i, \left(\frac{\partial^2 f}{\partial x \partial z}\right)_i \right\}^T$$

$$X_i = \left\{ (x-x_i), (y-y_i), (z-z_i), \tfrac{1}{2}(x-x_i)^2, \tfrac{1}{2}(y-y_i)^2, \tfrac{1}{2}(z-z_i)^2, \right. \qquad (3.3)$$
$$\left. (x-x_i)(y-y_i), (y-y_i)(z-z_i), (x-x_i)(z-z_i), (x-x_i)(z-z_i) \right\}^T$$

It should be noted that $X_i$ is a vector from a point in the neighborhood of cell i to the center of cell i; and $D_i$ is a column matrix of derivatives of f.

In embodiments, to construct a relation between the original field variable value and the filtered field variable value, $D_i$ should be calculated. Accordingly, let $f_{ik} = f_i(x_k, y_k, z_k)$ be the value of the field variable at the center of cell k, obtained from Equation (3.1) by substituting the center coordinates of a neighbor cell k of cell i. Since $f_{ik}$ is obtained by Taylor series expansion, it will not be exactly the same as the real value $f_k$ at the center of cell k. Consider K neighbors of cell i, an error function can be formed as set forth in Equation (3.4) below:

$$E_i = \sum_{k=1}^{K} (f_{ik} - f_k)^2 \qquad (3.4)$$
$$= \sum_{k=1}^{K} \left\{ \left(\frac{\partial f}{\partial x}\right)_i (x_k - x_i) + \left(\frac{\partial f}{\partial y}\right)_i (y_k - y_i) + \right.$$
$$\left(\frac{\partial f}{\partial z}\right)_i (z_k - z_i) + \tfrac{1}{2}\left(\frac{\partial^2 f}{\partial x^2}\right)_i (x_k - x_i)^2 +$$
$$\tfrac{1}{2}\left(\frac{\partial^2 f}{\partial y^2}\right)_i (y_k - y_i)^2 + \tfrac{1}{2}\left(\frac{\partial^2 f}{\partial z^2}\right)_i (z_k - z_i)^2 +$$
$$\left(\frac{\partial^2 f}{\partial x \partial y}\right)_i (x_k - x_i)(y_k - y_i) +$$
$$\left(\frac{\partial^2 f}{\partial x \partial y}\right)_i (y_k - y_i)(z_k - z_i) + \left(\frac{\partial^2 f}{\partial y \partial z}\right)_i (x_k - x_i)(z_k - z_i) +$$
$$\left. f_i - f_k \right\}^2$$

In embodiments, by means of a least square method, Equation (3.5) is obtained:

$$C_i D_i = \tilde{F}_i \qquad (3.5)$$

where $D_i$ is defined in (3.2), $$\tilde{F}_i = \sum_{k=1}^{K} (f_k - f_i)((x_k - x_i), (y_k - y_i), (z_k - z_i), (x_k - x_i)^2, \qquad (3.6)$$
$$(y_k - y_i)^2, (z_k - z_i)^2, (x_k - x_i)(y_k - y_i), (y_k - y_i)(z_k - z_i),$$
$$(x_k - x_i)(z_k - z_i) \}^T$$
$$= \sum_{k=1}^{K} (f_k - f_i) \tilde{G}_{ik} = \sum_{k=1}^{K} f_k \tilde{G}_{ik} - f_i \sum_{k=1}^{K} \tilde{G}_{ik},$$

$$\tilde{G}_{ik} = ((x_k - x_i), (y_k - y_i), (z_k - z_i), (x_k - x_i)^2, (y_k - y_i)^2, (z_k - z_i)^2, \qquad (3.7)$$
$$(x_k - x_i)(y_k - y_i), (y_k - y_i)(z_k - z_i), (x_k - x_i)(z_k - z_i) \}^T,$$

and $C_i$ is a 9×9 matrix, whose elements are related to the coordinates of centers of cell i and its K neighbor cells. Solving Equation (3.5) yields Equation (3.8):

$$D_i = C_i^{-1} \tilde{F}_i. \qquad (3.8)$$

Hence the original value of field variable f around the center of cell i is $$f(x, y, z; x_i, y_i, z_i) = f_i + \{(x - x_i), (y - y_i), (z - z_i),$$
$$\tfrac{1}{2}(x - x_i)^2, \tfrac{1}{2}(y - y_i)^2, \tfrac{1}{2}(z - z_i)^2,$$
$$(x - x_i)(y - y_i), (y - y_i)(z - z_i),$$
$$(x - x_i)(z - z_i) \} \cdot D_i$$
$$= f_i + X_i \cdot D_i = f_i + X_i C_i^{-1} \tilde{F}_i$$

Since, in embodiments, only the filtered field variable is solved from the LES equations, to get the original field variable value requires creating a relation between the original and filtered variable values. In embodiments, a filtering scheme may be used to form a relationship between the original field variable value and the filtered field variable value. In embodiments, box filtering is used, but one skilled in the art shall recognize that other filtering schemes may be employed. Using box-filter, which is an average of the original value, and assuming the scope of the filter is just the cell, yields:

$$\bar{f}_i = \frac{\int_V f(x, y, z; x_i, y_i, z_i) dx dy dz}{V_i} = f_i + \frac{\int_V X_i C_i^{-1} \tilde{F}_i dx dy dz}{V_i} \qquad (3.9)$$

where $V_i$ is the volume of cell i.

Substituting Equation (3.6) yields Equation (3.10):

$$\bar{f}_i = f_i + \frac{\int_V X_i C_i^{-1} \left[ \sum_{k=1}^{K} f_k \tilde{G}_{ik} - f_i \sum_{k=1}^{K} \tilde{G}_{ik} \right] dx dy dz}{V_i} \qquad (3.10)$$
$$= f_i \left( 1 - \frac{1}{V_i} \sum_{k=1}^{K} \int_V X_i C_i^{-1} \tilde{G}_{ik} \, dx dy dz \right) +$$
$$\frac{1}{V_i} \sum_{k=1}^{K} f_k \int_V X_i C_i^{-1} \tilde{G}_{ik} \, dx dy dz$$

It should be noted that, in this embodiment, the filtered field variable $\bar{f}_i$ in the i-th cell is a linear combination of the original field variable values at the centers of the i-th cell and its neighbors. As will be discussed in more detail below, the neighborhood of the i-th cell may be defined in different ways.

It shall also be noted that, in this embodiment, the coefficients of this linear relation are only related to the center coordinates and shapes of these cells. Combining Equation (3.10) for all of the cells in the unstructured grid system yields:

$$\bar{F} = LF^* \qquad (3.11)$$

where $\bar{F}$ is a vector array whose elements are the filtered field values at the center of cells and $F^*$ is a vector array whose elements are the original field values at the center of cells. The coefficient matrix L is a huge sparse matrix whose non-trivial elements relate only to the geometry of the unstructured mesh system. If the unstructured mesh system does not change during a simulation, the coefficient matrix remains the same throughout the course of the simulation.

Inverting the linear system of Equation (3.11) yields Equation (3.12):

$$F^* = L^{-1}\overline{F} \quad (3.12)$$

Thus, the original field variable may be determined from the filtered field variable. Therefore, if f and g are two field variables and their values at cell centers of an unstructured grid system are the elements of vector arrays F* and G*, then $$F^* = L^{-1}\overline{F}, \qquad G^* = L^{-1}\overline{G} \quad (3.13)$$

$$\overline{F^*G^*} = L(F^*G^*) \quad \{\overline{f'g'}\} = \overline{F^*G^*} - \overline{FG}$$

For purposes of clarification, there are a few matters to consider. First, as noted previously, there is an issue of what number of neighbor cells, i.e. K, to be included in the error function of Equation (3.4). The choice of number K is flexible. Too few neighbor cells included in Equation (3.4) will likely reduce the accuracy of the model, and too many neighbor cells included in Equation (3.4) tends to increase the bandwidth of the coefficient matrix L in Equation (3.13). In embodiments, a way to select K for the error function of Equation (3.4) for a cell i is that the error function includes the direct neighbor cells of cell i (i.e., the cells that share an edge face with cell i) and the direct neighbor cell of those direct neighbors. For example, referring to FIG. 2, cell k, and other cells with an asterisk (*) at its center, should be included in the error function of cell i because it is a direct neighbor of cell i. A cell with a hollow circle (o) at its center should also be included because it is a direct neighbor cell of a direct neighbor cell of cell i. However, the cell with a hollow square (□) would not be included. One skilled in the art shall recognize that other methods may be employed to define the neighborhood of cells for cell i. Note that the number of neighboring cells, K, may change from cell to cell. In embodiments, if the unstructured grid system in three space dimensions comprises tetrahedrons (which has four faces), the number K should be less than 16 (which is 4 times 4).

A second matter to consider is the scale of filtering. In embodiments of Equation (3.9) and Equation (3.10), it is assumed that the scale of filtering is "space only" and is the same as the size of the considered cell. In embodiments, the filter operator not only can have a different space scale but also can have a certain scale in time domain. In embodiments, the scale of filtering may be decided by numerical tests (so that the results will be accurate when compared to experimental data). However, for unstructured grid system, it is difficult to define a scale that is different from the cell size. For example, if one wants a scale that is 30% bigger than the considered cell, what would be the shape and orientation of the bigger cell for filter? Thus, in embodiments, the following way is offered to make the S-model both time and space scaled:

$$F^* = L^{-1}\overline{F}, \qquad G^* = L^{-1}\overline{G} \quad (3.14)$$

$$\overline{F^*G^*} = L(F^*G^*) \quad \{\overline{f'g'}\} = \left(\frac{1}{\sqrt{3}}\right)^\alpha (\overline{F^*G^*} - \overline{FG})$$

where α is a scale parameter related to the number of dimension of the simulation problem (NOD):

$$\alpha = 2*NOD*2 \quad (3.15)$$

Thus, α=12 for three-dimensional problems and α=8 for two-dimensional problems. In embodiments, one "2" in the Equation (3.15) relates to the time dimension, which has two degrees of freedom for positive and negative time. And, in embodiments, the other "2" in the Equation (3.15) relates to the second-order correlation terms or quantities.

One skilled in the art shall recognize a number of advantages of the time and space scaled S-model. For example, it is a general relationship between filtered and unfiltered values of any variable due to independence of operation L from variables. Also, there is no additional empirical constant and physical hypothesis. Thus, in embodiments, except for the relationship to the number of dimensions for the simulation, the scale factor $$\left(\frac{1}{\sqrt{3}}\right)^\alpha$$

remains the same regardless of the simulation application.

IV. Embodiments for Simulating Fluid Flow

Figure 3:
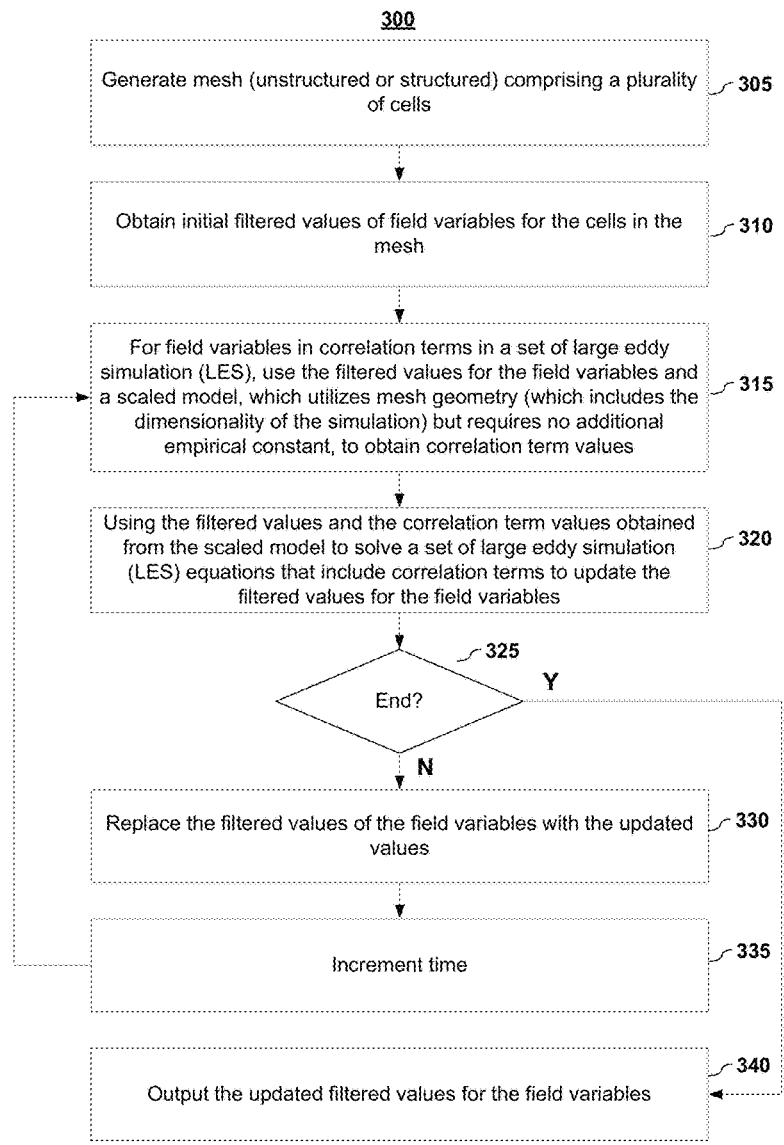
FIG. 3 depicts a method for simulating fluid flow according to embodiments of the present invention.

Turning now to FIG. 3, depicted is a method for simulating fluid flow according to embodiments of the present invention. In the depicted embodiment, the method commences by generating (305) a mesh, which may be structured or unstructured, comprising a plurality of cells. Given initial conditions, initial sets of filtered values of field variables for the cells in the mesh are obtained (310). As mentioned previously, the field variable f, may be any field variable or a combination thereof.

To solve the large eddy simulation (LES) equations, the values for the correlation terms are obtained. Thus, for field variable with corresponding correlation terms, the set of filtered values for the field variable are input into the scaled S-model, which utilizes the mesh geometry, which includes the dimensionality of the simulation (2D or 3D), to obtain (315) correlation term values.

Figure 4:
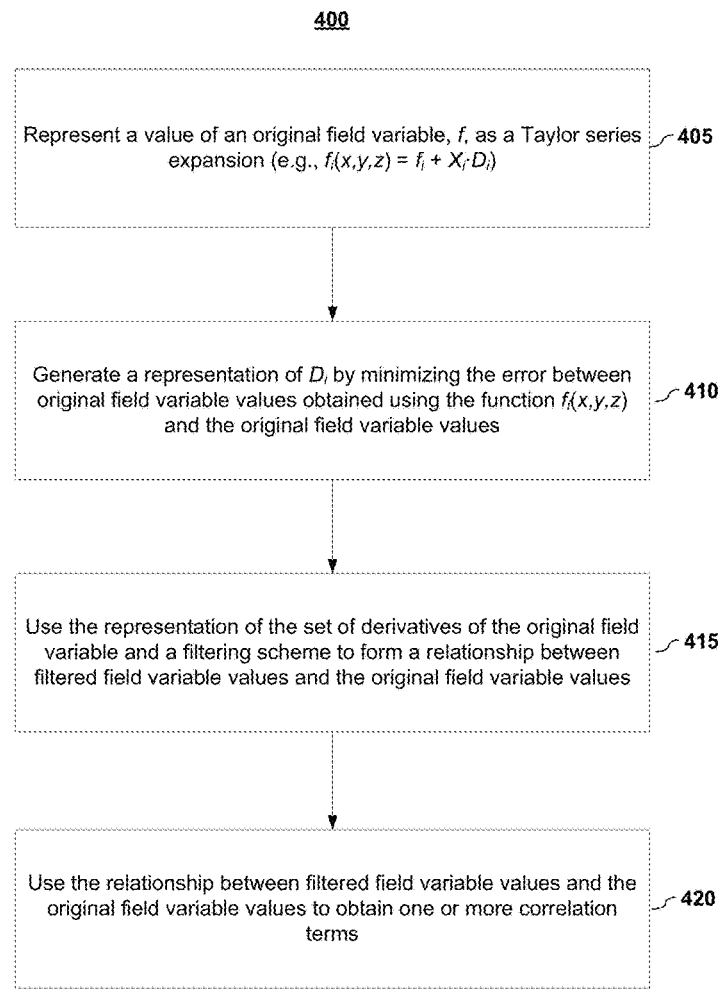
FIG. 4 depicts an embodiment of a scaled S-model methodology for obtaining correlation term values according to embodiments of the present invention.

FIG. 4 depicts an embodiment of a scaled S-model methodology for obtaining correlation term values according to embodiments of the present invention. As shown in FIG. 4, embodiments of the model comprise representing a value of an original field variable, f, as a Taylor series expansion (405), such as in Equation (3.1), a form of which is reproduced below:

$$f_i(x,y,z) = f_i + X_i \cdot D_i \quad (3.1)$$

As previously discussed regarding Equations (3.4)-(3.8), a representation of $D_i$ can be obtained (410) by minimizing the error between original field variable values obtained using the Taylor series function and the original field variable values. Using the representation of the set of derivatives of the original field variable and a filtering scheme, a relationship can be formed (415) between filtered values of the original field variable and the original field variable, as discussed above with respect to Equations (3.9)-(3.14).

Note that Equation (3.14) provides a time and space scaled relationship between filtered values of the field variable and the original field variable, which allows the correlation term (e.g., $\overline{f'g'}$) to be obtained (420) from the scaled difference between them. Note that f and g may be any field variable that is included in a correlation term in the LES equations (e.g., ρ, u, v, w, e, or some combination thereof). For example, to obtain the correlation term values the correlation term $\overline{(\rho E)'u'}$ in the term $$\frac{\partial \overline{(\rho E)'u'}}{\partial x}$$

in Equation (2.10), f' may represent (ρE)' and g' may represent u'.

Returning to FIG. 3, the filtered values and the correlation values obtained (320) from the scaled S-model may then be used to solve a set of LES equations that include terms with the correlation values (e.g., Equations (2.6)-(2.10), above). The output of the solved LES equations is updated filtered values for the field variables. It shall be noted that any method or numerical scheme for solving compressible Navier-Stokes equations may be used to solve the LES equations. One example of such a numerical scheme, which may be used in embodiments, is the BGK scheme, which is discussed in more detail below.

In embodiments, unless a stop condition has been reached (325), the updated filtered values replace (330) the filtered values, a time step is incremented (335), and the process iterates by returning to step 315. In embodiments, the stop conditions may be one or more of: (1) a set number of iterations has occurred; (2) a set amount of time has elapsed; and (3) a user-specified stop condition. One skilled in the art shall recognize that other stop conditions may be employed.

If a stop condition has been reached (325), the updated filtered field variable values may be outputted (340).

Figure 5:
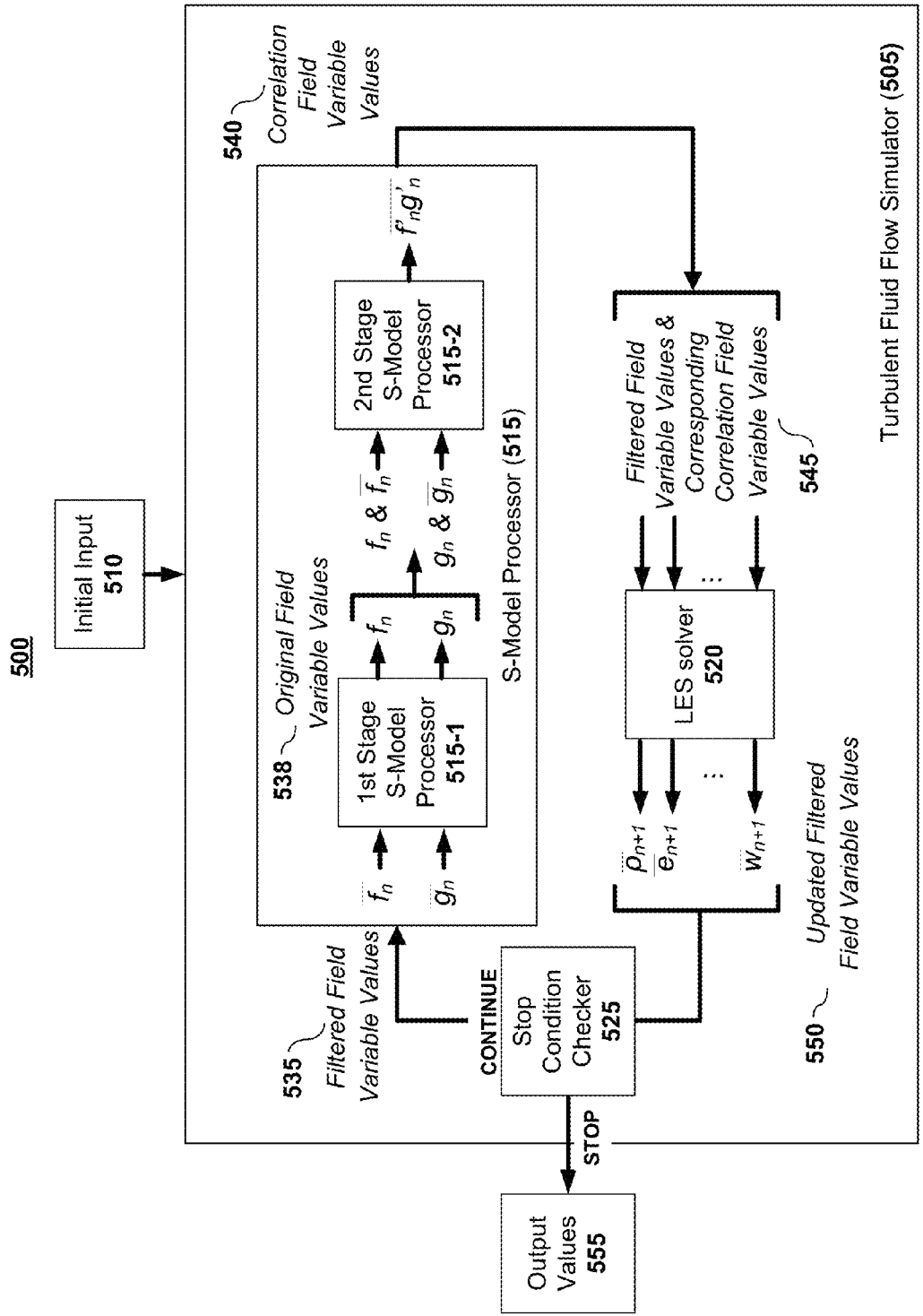
FIG. 5 depicts a simulation system according to embodiments of the present invention.

FIG. 5 depicts a simulation system 505 according to embodiments of the present invention. In embodiments, the fluid flow simulator 505 receives initial input data 510 for a fluid flow simulation and outputs simulated fluid flow values 555 for field variables. In embodiments, a fluid flow simulator 505 comprises an S-model processor 515, a large scale eddy (LES) solver 520, and a stop condition checker 525. Additionally or alternatively, the fluid flow simulator 505 may also comprise a mesh generator (not shown) and an initializer (not shown) for receiving the initial input data, generating a structured or unstructured mesh, and generating initial filtered values. In embodiments, the initial filtered values may be obtained by solving the Navier-Stokes equations for laminar flow for a few iterations. One skilled in the art shall recognize that other methods may be employed to generate initial filtered field values.

In embodiments, for each field variable from a set of field variables, the S-model processor 515 receives filtered field variable values 535 and outputs corresponding correlation values 540. In embodiments, the S-Model processor 515 may use methods previously described to obtain the correlation term values.

In embodiments, the S-Model processor 515 may comprise two subcomponents: a first stage S-Model processor 515-1 and a second stage S-Model processor 515-2. This embodiment is depicted in FIG. 5. In this embodiments, each of the filtered values that are involved in correlation terms (e.g., $\bar{f}_n$) are input into the first stage S-Model processor 515-1 and its corresponding original field variable values 538 are output (e.g., $f_n$). In embodiments, this process may be done for all such filtered values prior to progressing to the second stage. Sets of filtered field variable values and corresponding original field variable values (e.g., $\bar{f}_n$ & $f_n$, and $\bar{g}_n$ & $g_n$) are input into the second stage S-Model processor 515-2 to output the corresponding correlation term values (e.g., $\overline{f'g'}$).

When the correlation field variable values 540 for the field variables have been generated, the filtered field variable values and corresponding correlation field variable values 545 are input into the LES solver 520. The LES solver 520 uses the values 545 in LES equations that include correlation terms to solve the equations and output updated filtered field variable values 550. The LES solver may employ any method or numerical scheme for solving compressible Navier-Stokes equations to solve the LES equations. One example of such a numerical scheme, which may be used in embodiments, is the BGK scheme, which is discussed in more detail below.

In embodiments, the stop condition checker 525 determines whether one or more stop conditions have been reached. If a stop condition or conditions have been reached, the updated field variable values are outputted 555. If not, the fluid flow simulator 505 iterates the process by inputting the updated filtered field variable values into the S-Model processor 515.

V. Exemplary BGK Scheme for Solving LES Equations

Figure 6:
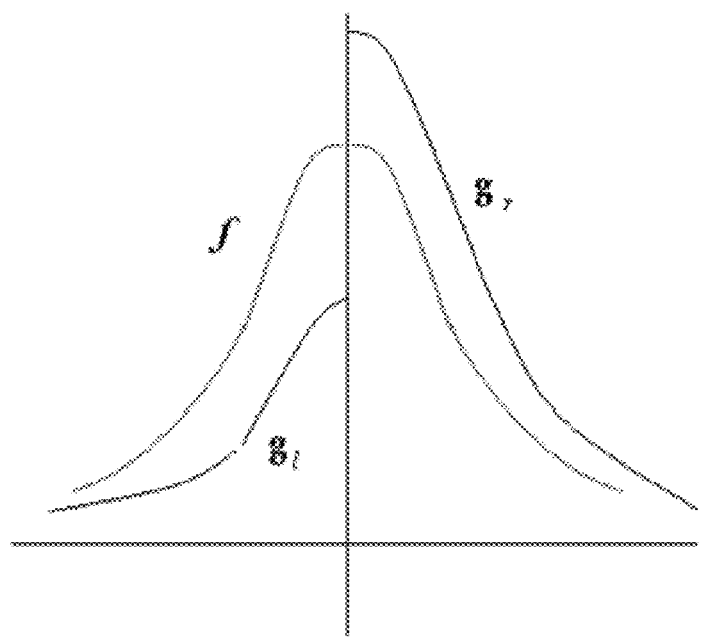
FIG. 6 illustrates equilibrium states according to embodiments of the present invention.

Presented below is a methodology for solving the LES equations to obtain updated filtered field variable values. In embodiments, the BGK scheme, which is based on the Gas Kinetic Equation, may be used to solve the Navier-Stokes equations. The scheme is also named the GKE scheme. According to the gas kinetic theory, the distribution function $f(\vec{x}, t, \vec{v}, \xi)$ satisfies the Boltzmann equation:

$$f_t + \vec{v} \cdot \nabla f = Q \tag{5.1}$$

where Q is a complicated source term related to the collision among numerous gas molecules, $\vec{v}$ is the translational velocity of gas molecules, and $\xi$ is the internal particle velocity, which is related to the rotation and vibration of gas particle. To solve this equation directly is a very difficult task. In 1950, Bhatnagar, Gross, and Krook developed a model in which the source term Q is replaced by $(g-f)/\tau$ and the equation assumes the following form:

$$f_t + \vec{v} \cdot \nabla f = \frac{g - f}{\tau} \tag{5.2}$$

where g is the distribution function at an equilibrium state of gas, i.e. the Maxwell distribution, and τ is the average time interval between two consecutive collisions of the particle. This model is named the BGK model. The Boltzmann equation with BGK model (Equation (5.3), below) has the following general solution:

$$f(x, y, z, t, u, v, w, \xi) = \tag{5.3}$$
$$\frac{1}{\tau} \int_{t_o}^{t} g(x - u(t - t'), y - v(t - t'), z - w(t - t'), t', u, v, w, \xi)$$
$$e^{-\frac{t-t'}{\tau}} dt' +$$
$$e^{-\frac{t-t_o}{\tau}} f_o((x - u(t - t_o), y - v(t - t_o), z - w(t - t_o), t_o, u, v, w, \xi))$$

where $f_o$ is the initial distribution function $f$, and g is the corresponding equilibrium state in space and time. The distribution function at an equilibrium state of gas, i.e. the Maxwell distribution, has the following form:

$$g(x, y, z, u, v, w, t) = \rho \left(\frac{\lambda}{\pi}\right)^{\frac{K+N}{2}} e^{-\lambda\{(u-U)^2+(v-V)^2+(w-W)^2+\xi^2\}} \quad (5.4)$$

where $\vec{V}$ is velocity vector of macro-movement of gas, K is inner degree of freedom of gas particle, N is the number of space dimension, here it is 3. Moreover $$\lambda = \frac{K+N}{4} \frac{\rho}{\rho E - \frac{1}{2}\rho(U^2+V^2+W^2)} \quad (5.5)$$

where E is total energy of gas. Although there is a general form of the solution of Boltzmann equation, it is still difficult and complex. Usually the states of fluid in the both side cells of an inner face are assumed to be different but equilibrium at initial time of every time step as shown in FIG. 6, where $g_l$ and $g_r$ are equilibrium states in left and right side respectively. $f$ expresses the new state on the surface, which can be obtained from Equation (5.3) through complex calculation.

The relationship between the distribution function $f$ and the macroscopic field variables is:

$$\overline{W} \equiv \begin{pmatrix} \rho \\ \rho\vec{V} \\ \rho E \end{pmatrix} = \int \psi_\alpha f d\vec{v} d\xi \quad (5.6)$$

i.e. $$\overline{W} \equiv \begin{pmatrix} \rho \\ \rho U \\ \rho V \\ \rho W \\ \rho E \end{pmatrix} = \int \psi_\alpha f du dv dw d\xi$$

and $$\psi_\alpha = \left(1, \vec{v}, \frac{1}{2}(\vec{v}\cdot\vec{v}+\xi^2)\right)^T = \left(1, u, v, w, \frac{1}{2}(u^2+v^2+w^2+\xi^2)\right)^T \quad (5.7)$$

In addition, the flux through a plane normal to the x axis is:

$$F_x(\overline{W}_{j+1/2}) \equiv \begin{pmatrix} F_\rho \\ F_{\rho U} \\ F_{\rho V} \\ F_{\rho W} \\ F_{\rho E} \end{pmatrix}_x = \int u\psi_\alpha f d\vec{v} d\xi \quad (5.8\text{-}1)$$

Similarly, the flux through planes normal to the y and z axes are respectively $$F_y(\overline{W}_{j+1/2}) \equiv \begin{pmatrix} F_\rho \\ F_{\rho U} \\ F_{\rho V} \\ F_{\rho W} \\ F_{\rho E} \end{pmatrix}_x = \int v\psi_\alpha f d\vec{v} d\xi \quad (5.8\text{-}2, 3)$$

-continued $$F_z(\overline{W}_{j+1/2}) \equiv \begin{pmatrix} F_\rho \\ F_{\rho U} \\ F_{\rho V} \\ F_{\rho W} \\ F_{\rho E} \end{pmatrix}_x = \int w\psi_\alpha f d\vec{v} d\xi$$

Integrating both sides of BGK Boltzmann equation and considering compatibility yields:

$$\frac{\partial}{\partial t}\overline{W} + \frac{\partial}{\partial x}F_x(\overline{W}) + \frac{\partial}{\partial y}F_y(\overline{W}) + \frac{\partial}{\partial z}F_z(\overline{W}) = 0 \quad (5.9)$$

It has been proved that this equation is equal to the N-S equations. For rectangular mesh, we have $$\overline{W}_{i,j,k}^{n+1} = \overline{W}_{i,j,k}^n - \Delta t \left\{ \frac{F_x(\overline{W}_{i+1/2,j,k}^n) - F_x(\overline{W}_{i-1/2,j,k}^n)}{\Delta x} + \frac{F_y(\overline{W}_{i,j+1/2,k}^n) - F_y(\overline{W}_{i,j-1/2,k}^n)}{\Delta y} + \frac{F_z(\overline{W}_{i,j,k+1/2}^n) - F_z(\overline{W}_{i,j,k-1/2}^n)}{\Delta z} \right\} \quad (5.10)$$

For unstructured mesh, we have $$\overline{W}_{i,j,k}^{n+1} = \overline{W}_{i,j,k}^n - \Delta t \sum_k F_k(\overline{W}_k^n) \cdot s_k \quad (5.11)$$

where k denotes the index of side faces of the cell, $W_k$ means values of W on k-face. $s_k$ is area of side interface. To calculate the flux, the coordination system must rotate and the x axis is parallel to the normal direct of the side face.

From the above discussion, it can be seen that it is a finite volume method. Usually, its computation needs more CPU on computer due to integral of Equation (5.3). However, this method may be used in numerical simulation of both incompressible and compressible fluid flow. Upon consideration of Leer's limiter, the supersonic flow may be simulated too. Therefore, developed code may simulate various fluid flows easily. One skilled in the art shall note that this method is a finite volume method and may be parallelized easily.

VI. Parallel Processing with Unstructured Meshes

In embodiments, parallel processing may be employed to aid the computation. Domain decomposition is a very common technique for parallel processing. In embodiments, the computational domain is divided into sub-domains and each sub-domain is assigned to one processing unit. To get better parallelization efficiency, the nodes, mesh cells, and interfaces are carefully ordered between mesh cells. In embodiments, at first, the unstructured tetrahedral mesh may be created using a commercial mesh generator, such as, for example, the commercial software HYPERMESH by Altair Engineering of Troy, Mich. From HYPERMESH, the node number, cell number, and face number are not arranged orderly. Therefore, in embodiments, the sequence of nodes may be re-ordered along a selected direction, e.g. the direction of the main flow. In embodiments, the x direction is selected as the main flow direction. The node with a smaller x coordinate is assigned a smaller node number. If any two nodes have the same x coordinate, the one with the smaller y coordinate is assigned the smaller node number. Similarly, if both the x and y coordinates of the two nodes are same, the node number may be assigned according to their z coordinates. After the determination of node numbers, the sequence of cells is determined according to the sum of the numbers of the four node points. If more than one cell have the same sum, they may be ordered according to the minimum of their node numbers. Similarly, the numbers of the three nodes of each interface are summed and the sum is used to determine the sequence of the interfaces. Next, the computational domain is divided into subdomains, each of which has the same number of meshes. If the total number of mesh cells is not an integer multiple of the number of processes, the last mesh cell may be repeated for a couple of times to make it an integer multiple. It should be noted that, in embodiments, there is no overlap between subdomains at this moment. Because an explicit scheme is used and the CPU time for every mesh and every time step is same, then the CPU time solving the LES equation may be allocated on each processor, although the real mesh number is not integer times of used processors.

To ensure efficient data communication, each subdomain may be extended a little to create overlaps with its neighboring subdomains. In embodiments, the subdivision of nodes and interfaces is not the same as the subdivision of mesh cells. Note that, in embodiments, the subdivision is different for different arrays. In embodiments, every mesh cell at the domain boundary has four neighbors (first level) and each of its neighbors has other neighbors (second level). For every domain boundary mesh cell, the maximum difference between the sequence number of itself and those of its two levels of neighbors are calculated. The maximum value varies from one mesh cell to another, as well as from one domain boundary to the other. In embodiment, the maximum of those maximum values is multiplied by 1.2 and denoted as 'addmesh.' Then, all arrays for mesh center variables are declared as C(−addmesh+1:mymesh+addmesh), where 'mymesh' is equal to (total number of mesh)/(number of processes). Similarly, all arrays for face quantities are declared to be the form F(−addface+1:myface+addface). In embodiments, the arrays related to nodes are not divided for sub-domains. The above subdivision embodiment method ensures that all sub-domains are the same size, each computation process has the same load, and better data communication efficiency.

In embodiments, an important issue is to ensure the load balance of computation processes. BGK-scheme is an explicit finite volume method. Because the number of meshes is the same in each sub-domain, the load balance is ensured. According to the above discussion of the S-model, Equations 3.12 and 3.14 must be solved in each time step to get the un-filtered variables from each of the corresponding filtered variables. However, we note that the matrix L depends only on the mesh system. In our problem, the mesh system is fixed and does not move in simulation. Therefore, the matrix L may be constructed before the starting of the time loop. In addition, we find L is a banded and diagonal-dominated matrix. Hence an iteration method is used to solve the linear system resulting from Equations 3.12 and 3.14. In embodiments, a fixed number of iterations may be selected by doing a few separate numerical tests. This insures the convergence of the iteration process without doing too many iterations. To save computer memory, an additional array may be declared, which is used to find the location of a variable quickly. In the iteration process, the data communication among different processes is synchronized. In addition to the above measures on load balancing, the Message Passing Interface (MPI) routine MPI_BARRIER may be used to ensure the synchronization.

VII. System

Figure 7:
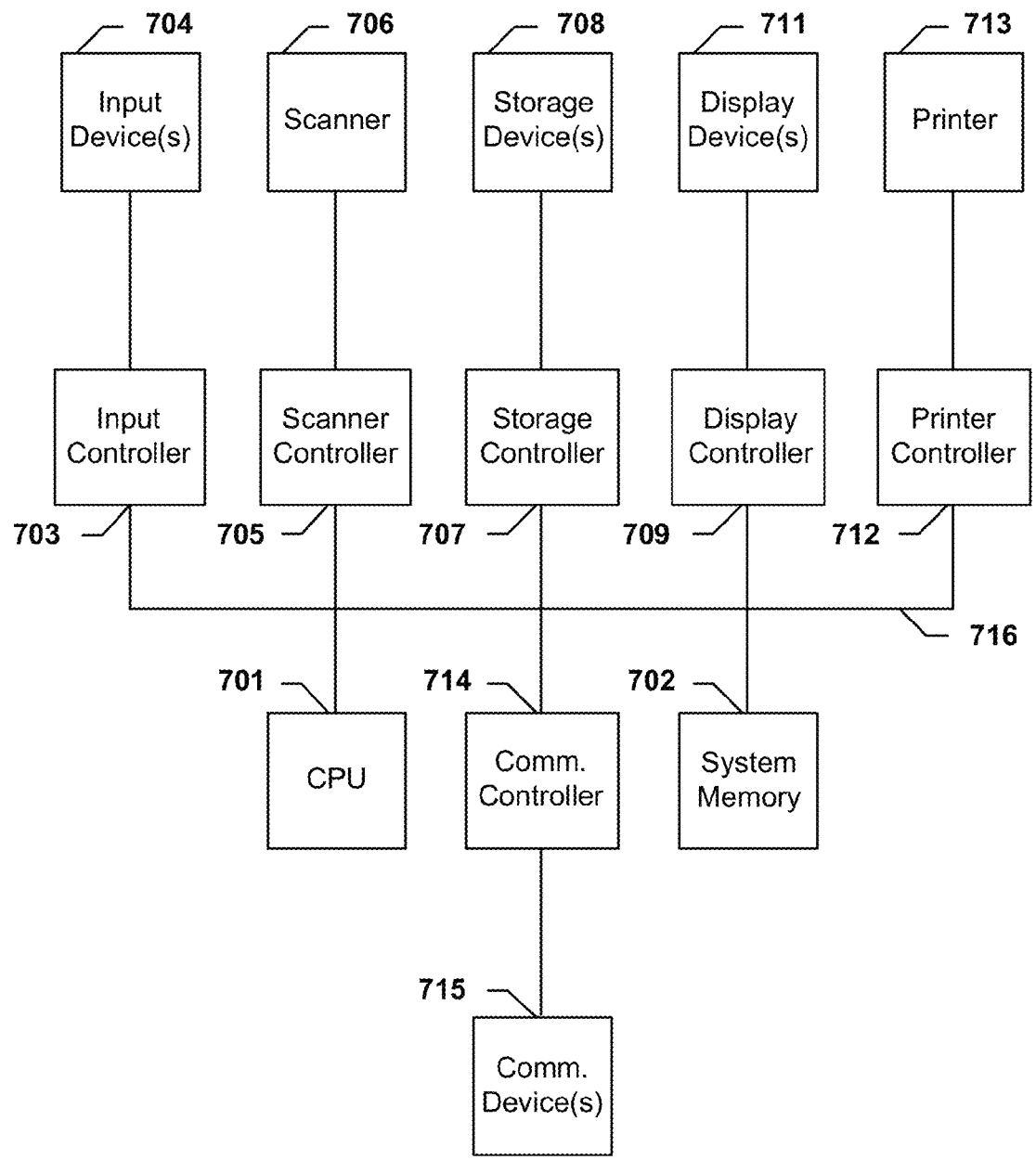
FIG. 7 illustrates a computing system or processing system according to embodiments of the invention.

Having described details of various embodiments and aspects of the inventive concepts, an exemplary system 700, which may be used to implement one or more aspects of the present invention, will now be described with reference to FIG. 7. As illustrated in FIG. 7, the system includes a central processing unit (CPU) 701 that provides computing resources and controls the computer. The CPU 701 may be implemented with a microprocessor or the like, and may also include a graphics processor and/or a floating point coprocessor for mathematical computations. The system 700 may also include system memory 702, which may be in the form of random-access memory (RAM) and read-only memory (ROM).

A number of controllers and peripheral devices may also be provided, as shown in FIG. 7. An input controller 703 represents an interface to various input device(s) 704, such as a keyboard, mouse, or stylus. There may also be a scanner controller 705, which communicates with a scanner 706. The system 700 may also include a storage controller 707 for interfacing with one or more storage devices 708 each of which includes a storage medium such as magnetic tape or disk, or an optical medium that might be used to record programs of instructions for operating systems, utilities and applications which may include embodiments of programs that implement various aspects of the present invention. Storage device(s) 708 may also be used to store processed data or data to be processed in accordance with the invention. The system 700 may also include a display controller 709 for providing an interface to a display device 711, which may be a cathode ray tube (CRT), a thin film transistor (TFT) display, or any other type of display. The system 700 may also include a printer controller 712 for communicating with a printer 713. A communications controller 714 may interface with one or more communication devices 715 which enables the system 700 to connect to remote devices through any of a variety of networks including the Internet, a local area network (LAN), a wide area network (WAN), or through any suitable carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

Embodiments or aspects of the present invention may be encoded upon one or more non-transitory computer-readable media with instructions for one or more processors or processor units to cause steps to be performed. It shall be noted that alternative implementations are certainly possible, including a hardware implementation or a software/hardware implementation. Any hardware-implemented functions may be realized using ASIC(s), programmable arrays, digital signal processing circuitry, or the like. Accordingly, the "means" terms in the claims are intended to cover both software and hardware implementations. Similarly, the phrase "computer-readable medium" or "computer-readable media" as used herein includes software or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

In accordance with further aspects of the invention, any of the above-described methods or steps thereof may be embodied in a program of instructions (e.g., software), which may be stored on, or conveyed to, a computer or other processor-controlled device for execution on a computer-readable medium. Alternatively, any of the methods or steps thereof may be implemented using functionally equivalent hardware (e.g., application specific integrated circuit (ASIC), digital signal processing circuitry, etc.) or a combination of software and hardware. In embodiments, one or more of the methods may be implemented using one or more processing units/systems.

While the invention has been described in conjunction with several specific embodiments, it is evident to those skilled in the art that many further alternatives, modifications, and variations will be apparent in light of the foregoing description. Thus, the invention described herein is intended to embrace all such alternatives, modifications, applications and variations as may fall within the spirit and scope of the appended claims.

What is claimed is:

1. A non-transitory machine-readable storage medium or non-transitory machine-readable media comprising one or more sequences of instructions which, when executed by one or more processors, simulates fluid flow in a simulation space by causing steps to be performed, comprising:
   [a] initializing a mesh comprising a plurality of cells, wherein each cell has associated geometric information related to the mesh and filtered field variables values;
   [b] inputting at least some of the values from the filtered field variables values and at least some of the geometric information of the cells in the mesh into a model to obtain correlation values for correlation terms in a set of large eddy simulation (LES) equations, the model obtaining the correlation values for a correlation term as a scaled difference between original field variables values associated with the correlation term and filtered field variables values associated with the correlation term, the difference being scaled by a scale factor that depends upon a number of dimensions of the mesh but that does not depend upon an empirical factor; and
   [c] using at least some of the filtered field variables values and at least some of the correlation values to solve the set of large eddy simulation (LES) equations to obtain updated filtered field variables values;
   wherein the scale factor is both time and space scaled; and
   wherein the scale factor is $$\left\{\frac{1}{\sqrt{3}}\right\}^\alpha,$$

where $\alpha$ is dependent upon the number of dimension of the mesh.

2. The non-transitory machine-readable storage medium or the non-transitory machine-readable media of claim 1 further comprising:
   responsive to a stop condition not being reached:
      replacing the filtered field variables values with the updated filtered field variables values;
      incrementing a time variable; and
      returning to step [b]; and
   responsive to a stop condition being reached, outputting at least some of the updated filtered field variables values.

3. The non-transitory machine-readable storage medium or the non-transitory machine-readable media of claim 1 wherein the step of [a] initializing a mesh comprising a plurality of cells, wherein each cell has associated geometric information related to the mesh and filtered field variables values, comprises:
   generating a mesh for the simulated space by dividing the simulated space into the plurality of cells; and
   obtaining initial values for filtered field variables.

4. The non-transitory machine-readable storage medium or the non-transitory machine-readable media of claim 3 wherein the mesh is unstructured.

5. The non-transitory machine-readable storage medium or the non-transitory machine-readable media of claim 1 wherein:
   $\alpha=2\times NOD\times 2$, in which NOD refers to the number of dimensions of the mesh.

6. A non-transitory machine-readable storage medium or non-transitory machine-readable media comprising one or more sequences of instructions which, when executed by one or more processors, causes steps to be performed comprising:
   for field variables that occur in at least one correlation term in a set of large eddy simulation equations, obtaining original field variable values for the field variable using filtered field variable values in an unstructured mesh and a relationship between the filtered field variable and the original field variable, the relationship being obtained by performing the steps comprising:
   representing an original field variable value at a point in the unstructured mesh as a Taylor series comprising an original field variable value of a cell in the mesh plus a product of a set of values related to position of the point relative to the cell multiplied by a set of derivatives of the original field variable;
   representing the set of derivatives of the original field variable by minimizing error between values of the original field variable at a plurality of neighboring cells obtained using the Taylor series representation and the values of the original field variable at the plurality of neighboring cells; and
   using the representation of the set of derivatives of the original field variable and a filtering scheme to form the relationship between the filtered field variable and the original field variable; and
   for pairs of filtered field variables that occur together in a correlation term in the set of large eddy simulation equations, obtaining values for the correlation term as a product of a scaled factor and a difference between a product of the original field variable values of the pair less a product of the filtered field variable values of the pair, wherein the scaled factor does not vary between different simulations with an equivalent number of dimensions of the unstructured mesh;

wherein the scaled factor is a time and space scale factor of $$\left\{\frac{1}{\sqrt{3}}\right\}^{\alpha},$$

wherein α is dependent upon the number of dimension of the unstructured mesh.

7. The non-transitory machine-readable storage medium or the non-transitory machine-readable media of claim 6 wherein:
α=2×NOD×2, in which NOD refers to the number of dimensions of the unstructured mesh.

8. The non-transitory machine-readable storage medium or the non-transitory machine-readable media of claim 7 wherein:
responsive to the unstructured mesh being a two-dimensional mesh, setting NOD to a value of 2; and
responsive to the unstructured mesh being a three-dimensional mesh, setting NOD to a value of 3.

9. The non-transitory machine-readable storage medium or the non-transitory machine-readable media of claim 6 wherein the relationship between the filtered field variable and the original field variable is:
$F^* = L^{-1} \overline{F}$, where $\overline{F}$ represents an array of filtered values for cells in the unstructured mesh, $F^*$ represents an array of original field values for cells in the unstructured mesh, and $L^{-1}$ is an inverse of a coefficient matrix L that relates to the geometry of the unstructured mesh.

10. The non-transitory machine-readable storage medium or the non-transitory machine-readable media of claim 6 wherein the values obtained for the correlation terms are used with the filtered field variable values in the a set of large eddy simulation equations to obtain updated filtered field variable values.

11. A non-transitory machine-readable storage medium or non-transitory machine-readable media comprising one or more sequences of instructions which, when executed by one or more processors, causes steps to be perform comprising:
[a] initializing a mesh comprising a plurality of cells, wherein each cell has associated filtered field variables values;
[b] for each unique correlation term in a set of large eddy simulation (LES) equations comprising a product of a first filtered field variable and a second filtered field variable, obtaining correlation term values using a set of values for the first filtered field variable and a set of values for the second filtered field variable and geometry of the mesh as an input to a time and space scaled model, the time and space scaled model being scaled by a scale factor that depends upon a number of dimensions of the mesh geometry but that does not depend upon an empirical factor; and
[c] using the filtered field variables values and correlation terms values to solve the set of large eddy simulation (LES) equations to obtain updated values of the filtered field variables;
wherein the scale factor is both time and space scaled; and
wherein the scale factor is $$\left\{\frac{1}{\sqrt{3}}\right\}^{\alpha},$$

where α is dependent upon the number of dimension of the mesh geometry.

12. The non-transitory machine-readable storage medium or the non-transitory machine-readable media of claim 11 wherein:
α=2×NOD×2, in which NOD refers to the number of dimensions of the mesh geometry.

13. The non-transitory machine-readable storage medium or the non-transitory machine-readable media of claim 11 wherein, for at least one correlation term, at least one of the first filtered field variable and the second filtered field variable comprises a product of two field variables.

14. The non-transitory machine-readable storage medium or the non-transitory machine-readable media of claim 11 further comprising:
responsive to a stop condition not being reached:
replacing the filtered field variables values with the updated values of the filtered field variable;
incrementing a time variable; and
returning to step [b];
and
responsive to a stop condition being reached, outputting at least some of the updated values of the filtered field variables.

15. The non-transitory machine-readable storage medium or the non-transitory machine-readable media of claim 11 wherein the step of [a] initializing a mesh comprising a plurality of cells, wherein each cell has associated filtered field variables values, comprises:
generating a mesh for a simulated space by dividing the simulated space into the plurality of cells; and
obtaining initial values for mesh.

16. The non-transitory machine-readable storage medium or the non-transitory machine-readable media of claim 11 wherein the step of [c] using the filtered field variables values and correlation terms values to solve the set of large eddy simulation (LES) equations to obtain updated values of the filtered field variables comprises:
using a Bhatnagar-Gross-Krook (BGK) scheme to solve the set of large eddy simulation (LES) equations.

* * * * *